United States Patent
Chang et al.

(10) Patent No.: US 8,605,270 B2
(45) Date of Patent: Dec. 10, 2013

(54) COMPUTING DEVICE AND PRECISION TESTING METHOD OF OPTICAL LENS USING THE COMPUTING DEVICE

(75) Inventors: Chih-Kuang Chang, New Taipei (TW); Zhong-Kui Yuan, Shenzhen (CN); Jian-Hua Liu, Shenzhen (CN); Xiao-Guang Xue, Shenzhen (CN); Dong-Hai Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 6 days.

(21) Appl. No.: 13/564,772

(22) Filed: Aug. 2, 2012

(65) Prior Publication Data
US 2013/0077089 A1   Mar. 28, 2013

(30) Foreign Application Priority Data
Sep. 23, 2011  (CN) .......................... 2011 1 0286538

(51) Int. Cl.
*G01B 9/00*    (2006.01)

(52) U.S. Cl.
USPC ........................................ 356/124; 356/124.5

(58) Field of Classification Search
USPC ................................... 356/124, 124.5, 239.2
See application file for complete search history.

(56) References Cited

U.S. PATENT DOCUMENTS

2004/0179191 A1 *  9/2004  Kitabayashi et al. ......... 356/124

* cited by examiner

*Primary Examiner* — Tri T Ton
(74) *Attorney, Agent, or Firm* — Altis Law Group, Inc.

(57) ABSTRACT

In a precision testing method of an optical lens using a computing device, the computing device is connected to an imaging system. The computing device controls the imaging system to generate an image of an object according to light rays reflected from the object and collected by the optical lens. A dimension of the object is measured from the image. A maximum value and a minimum value of the dimension of the object are determined. A difference between the maximum value and the minimum value is calculated. According to the difference, it is determined whether the optical lens agrees with a precision requirement.

15 Claims, 3 Drawing Sheets

COMPUTING DEVICE AND PRECISION TESTING METHOD OF OPTICAL LENS USING THE COMPUTING DEVICE

BACKGROUND

1. Technical Field

The embodiments of the present disclosure relate to testing optical lenses, and particularly to a computing device and precision testing method of an optical lens using the computing device.

2. Description of Related Art

In image measuring process, an image capturing device is used to capture images of objects. If an optical lens of the image capturing device is imprecise, the images captured by the image capturing device are inaccurate, so that dimensions of the objects measured from the images are unreliable. Therefore, there is room for improvement in the art.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
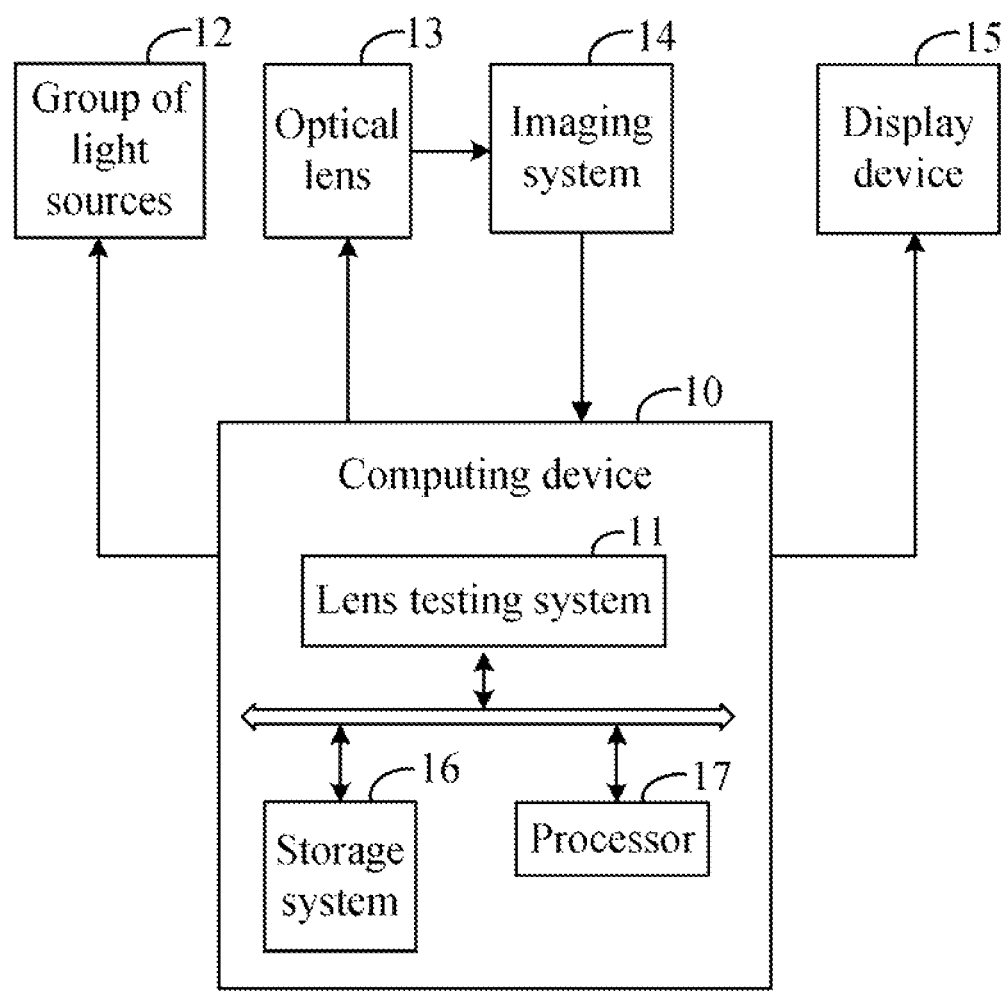
FIG. 1 is a block diagram of one embodiment of a computing device.

FIG. 1 is a block diagram of one embodiment of a computing device 10. The computing device 10 includes a lens testing system 11. The computing device 10 is connected to a group of light sources 12, an optical lens 13, an imaging system 14, and a display device 15. The group of light sources 12 provides various types of light (such as coaxial light, ring light, and profile light) to illuminate an object (not shown in FIG. 1) to be captured. The optical lens 13 collects light rays reflected from the object. The imaging system 14 generates an image of the object according to the light rays collected by the optical lens 13. In one embodiment, the optical lens 13 may be a zoom lens, whose focal length is changeable so as to zoom in or zoom out the object in the image. The imaging system 14 may use a charge couple device (CCD) or a complementary metal-oxide semiconductor (CMOS) as an image sensor. The testing system 11 tests precision of the optical lens 13. The display device 15 displays a test result of the optical lens 13.

In this embodiment, the computing device 10 further includes a storage system 16 and at least one processor 17. The storage system 16 may be a dedicated memory, such as an erasable programmable read only memory (EPROM), a hard disk driver (HDD), or flash memory. In some embodiments, the storage system 16 may also be an external storage device, such as an external hard disk, a storage card, or a data storage medium.

Figure 2:
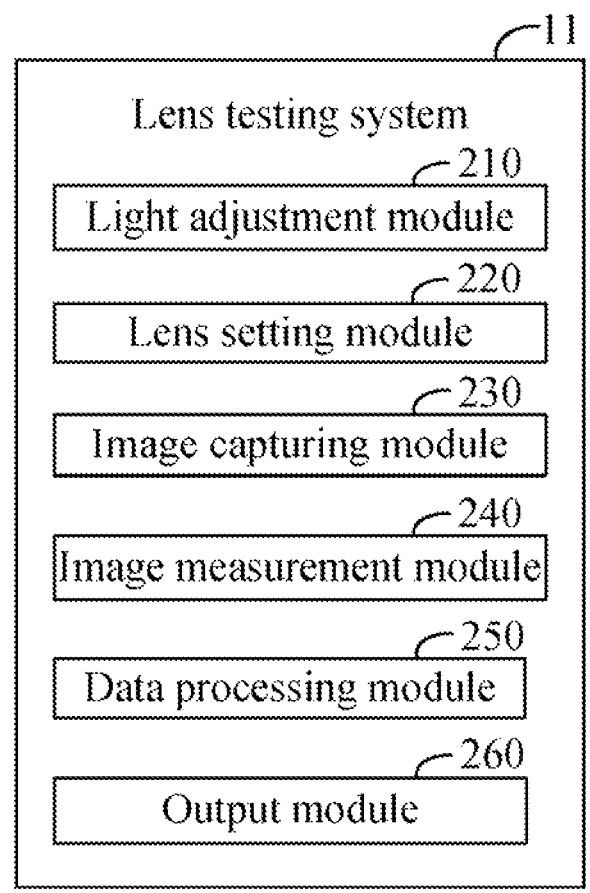
FIG. 2 is a block diagram of one embodiment of function modules of a lens testing system in FIG. 1.

FIG. 2 is a block diagram of one embodiment of function modules of the lens testing system 11 in FIG. 1. The lens testing system 11 includes a light adjustment module 210, a lens setting module 220, an image capturing module 230, an image measurement module 240, a data processing module 250, and an output module 260. The modules 210-260 may comprise computerized code in the form of one or more programs that are stored in the storage system 16. The computerized code includes instructions that are executed by the at least one processor 17, to provide the aforementioned functions of the test unit 20. A detailed description of the functions of the modules 210-260 is given in FIG. 3 below.

Figure 3:
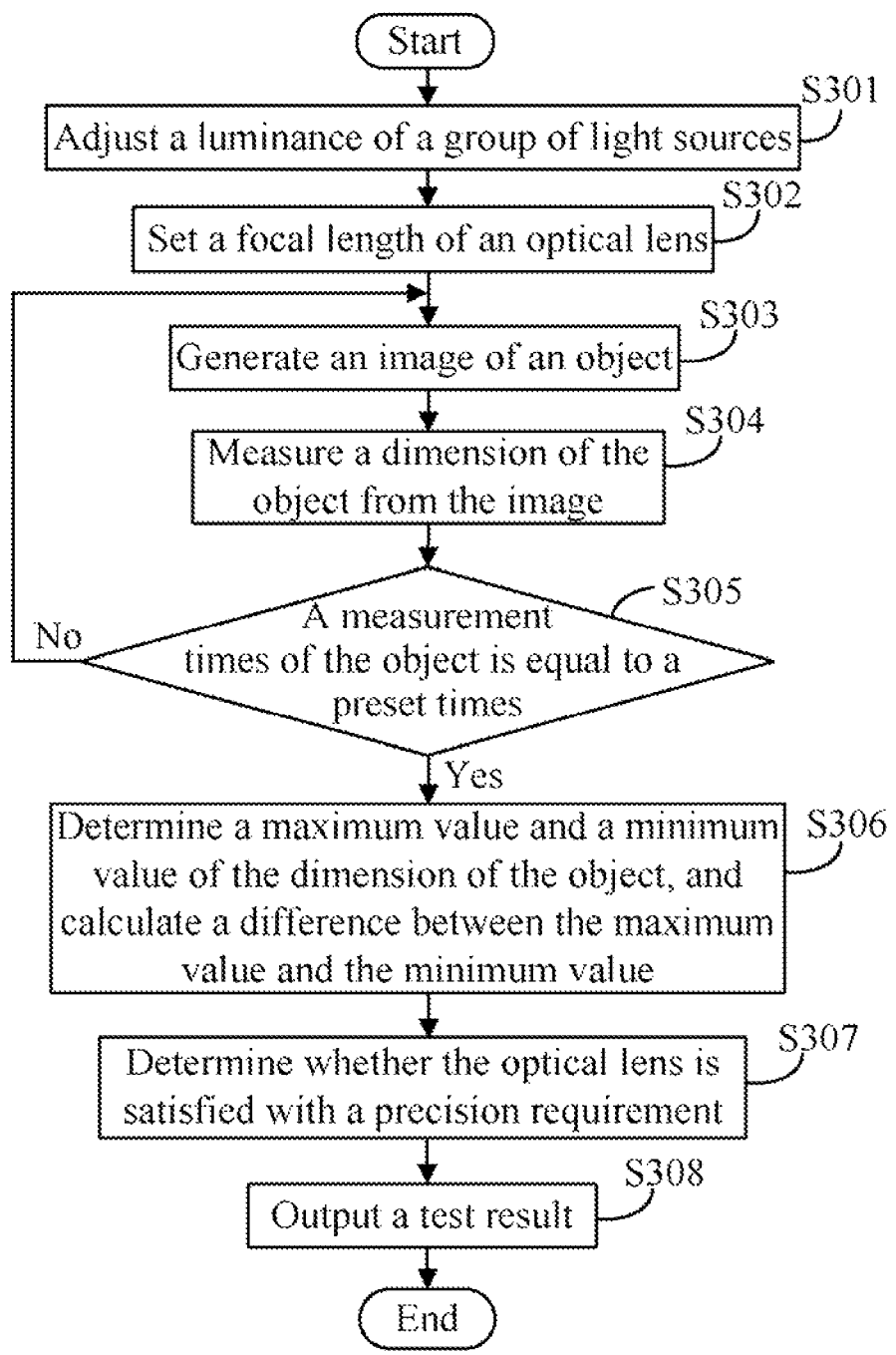
FIG. 3 is a flowchart of one embodiment of a precision testing method of an optical lens using the computing device in FIG. 1.

FIG. 3 is a flowchart of one embodiment of a precision testing method of the optical lens 13 using the computing device 10 in FIG. 1. Depending on the embodiment, additional steps may be added, others removed, and the ordering of the steps may be changed.

In step S301, the light adjustment module 210 adjusts a luminance of the group of light sources 12 to provide appropriate illumination for an object to be captured. In one embodiment, the computing device 10 is connected to the group of light sources 12 via a first serial port. The light adjustment module 210 sets a plurality of parameters of the first serial port before adjusting the luminance of the group of light sources 12. The parameters of the first serial port may include a baud rate, a data bit length, an optional parity bit, and a stop bit length.

In step S302, the lens setting module 220 sets the focal length of the optical lens 13. In one example, the focal length of the optical lens 13 can be selected from a group consisting of 10 mm, 20 mm, 50 mm, 100 mm, 200 mm, and 400 mm. The lens setting module 220 may set the focal length of the optical lens 13 as 10 mm. In this embodiment, the computing device 10 is connected to the lens 13 via a second serial port. The lens setting module 220 sets parameters of the second serial port before setting the focal length of the optical lens 13. Similar to the first serial port, the parameters of the second serial port may include a baud rate, a data bit length, an optional parity bit, and a stop bit length.

In step S303, the image capturing module 230 controls the imaging system 14 to generate an image of the object according to the light rays reflected from the object and collected by the optical lens 13, and obtains the image from the imaging system 14. The object may be engraved on a glass using laser and is against the optical lens 13. In one embodiment, the object may be a square or a circle, such as a circle with a diameter of 2.54 mm.

In step S304, the image measurement module 240 measures a dimension of the object (e.g., diameter of the circle or side length of the square) from the image. Each time the image measurement module 240 measures the dimension of the object, a dimension value of the object is obtained and a measurement times of the object is incremented by one.

In step S305, the image measurement module 240 determines whether the measurement times of the object is equal to a preset times. If the measurement times of the object is less than the preset times, the procedure returns to step S303. In one embodiment, the preset times is six.

If the measurement times of the object is equal to the preset times, in step S306, the data processing module 250 determines a maximum value and a minimum value of the dimension of the object, and calculates a difference between the maximum value and the minimum value. In one example, the object is a circle and the dimension is a diameter of the circle. Six diameter values of 2.52 mm, 2.56 mm, 2.68 mm, 2.60 mm, 2.58 mm, and 2.50 mm are obtained. Therefore, the maximum value of the diameter of the circle is 2.68 mm and the minimum value of the diameter of the circle is 2.50 mm. The difference between the maximum value and the minimum value of the diameter of the circle is 0.18 mm.

In step S307, the data processing module 25 determines whether the optical lens 13 agrees with a precision requirement according to the difference between the maximum and the minimum of the dimension of the object. In one embodiment, if the difference is less than an allowable deviation value (e.g., 0.2 mm), the data processing module 25 determines that the optical lens 13 agrees with the precision requirement. Otherwise, if the difference is equal or larger than the allowable deviation value, the data processing module 25 determines that the optical lens 13 disagrees with the precision requirement. For example, the allowable deviation range of the diameter of a circle is 0.2 mm. If the difference between the maximum and the minimum of the diameter of the circle is 0.18 mm, the optical lens 13 agrees with the precision requirement. Depending on the embodiment, the allowable deviation value may be modified when the focal length of the optical lens 13 is changed.

In step 308, the output module 260 outputs a result that indicates whether the optical lens 13 agrees with the precision requirement. In one embodiment, the output module 260 displays the result on the display device 15.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A precision testing method of an optical lens being executed by a processor of a computing device, the method comprising:
   controlling an imaging system connected to the computing device to generate an image of an object according to light rays reflected from the object and collected by the optical lens, and obtaining the image from the imaging system;
   measuring a dimension of the object in the image of the object;
   determining whether a measurement times of the object is equal to a preset times;
   determining a maximum value and a minimum value of the dimension of the object when the measurement times of the object is equal to the preset times, and calculating a difference between the maximum value and the minimum value;
   determining whether the optical lens agrees with a precision requirement according to the difference between the maximum and the minimum of the dimension of the object; and
   outputting a result that indicates whether the optical lens agrees with the precision requirement.

2. The method of claim 1, further comprising
   adjusting a luminance of a group of light sources connected to the computing device, to provide appropriate illumination for the object.

3. The method of claim 1, wherein the optical lens is a zoom lens whose focal length is changeable to zoom in or zoom out the object in the image.

4. The method of claim 3, further comprising:
   setting a focal length of the optical lens.

5. The method of claim 1, wherein the object is a circle, and the dimension is a diameter of the circle.

6. A computing device, comprising:
   a storage system;
   at least one processor; and
   a lens testing system comprising one or more programs that are stored in the storage system and executed by the at least one processor, the one or more programs comprising instructions to:
   control an imaging system connected to the computing device to generate an image of an object according to light rays reflected from the object and collected by an optical lens that is connected to the computing device, and obtaining the image from the imaging system;
   measure a dimension of the object in the image of the object;
   determine whether a measurement times of the object is equal to a preset times;
   determine a maximum value and a minimum value of the dimension of the object when the measurement times of the object is equal to the preset times, and calculating a difference between the maximum value and the minimum value;
   determine whether the lens agrees with a precision requirement according to the difference between the maximum and the minimum of the dimension of the object; and
   output a result that indicates whether the optical lens agrees with the precision requirement.

7. The computing device of claim 6, wherein the one or more programs further comprise instructions to:
   adjust a luminance of a group of light sources connected to the computing device, to provide appropriate illumination for the object.

8. The computing device of claim 6, wherein the optical lens is a zoom lens whose focal length is changeable to zoom in or zoom out the object in the image.

9. The computing device of claim 8, wherein the one or more programs further comprise instructions to set a focal length of the optical lens.

10. The computing device of claim 6, wherein the object is a circle, and the dimension is a diameter of the circle.

11. A non-transitory computer-readable storage medium storing a set of instructions, the set of instructions capable of being executed by a processor of a computing device to implement a precision testing method of an optical lens, the method comprising:
   controlling an imaging system connected to the computing device to generate an image of an object according to light rays reflected from the object and collected by the optical lens, and obtaining the image from the imaging system;
   measuring a dimension of the object in the image of the object;
   determining whether a measurement times of the object is equal to a preset times;
   determining a maximum value and a minimum value of the dimension of the object when the measurement times of the object is equal to the preset times, and calculating a difference between the maximum value and the minimum value;
   determining whether the lens agrees with a precision requirement according to the difference between the maximum and the minimum of the dimension of the object; and
   outputting a result that indicates whether the optical lens agrees with the precision requirement.

12. The storage medium of claim 11, wherein the method further comprises:
   adjusting a luminance of a group of light sources connected to the computing device, to provide appropriate illumination for the object.

13. The storage medium of claim 11, wherein the optical lens is a zoom lens whose focal length is changeable to zoom in or zoom out the object in the image.

14. The storage medium of claim 13, wherein the method further comprising:
   setting a focal length of the optical lens.

15. The storage medium of claim 11, wherein the object is a circle, and the dimension is a diameter of the circle.

* * * * *